United States Patent Office 2,709,706
Patented May 31, 1955

2,709,706

PREPARATION OF BETA-DITHIOCARBAMYL AND BETA-MERCAPTO CARBOXYLIC ACID AMIDES AND THE CORRESPONDING HYDRAZIDES

Jacob Eden Jansen, Akron, Ohio, assignor to The B. F. Goodrich Company, New York, N. Y., a corporation of New York No Drawing. Application May 6, 1950,
Serial No. 160,576

19 Claims. (Cl. 260—455)

This invention relates to the preparation of beta-dithiocarbamyl and beta-mercapto carboxylic acid amides and the corresponding hydrazides, and pertains more particularly to the preparation of such compounds by the reaction of 2-mercapto-4-keto-5,6-dihydrothiazines with various amino compounds.

It is disclosed in U. S. Patent 2,474,839 to Gresham and Jansen that beta-lactones react with dithiocarbamates to give, on subsequent acidification, beta-dithiocarbamyl carboxylic acids; for example, beta-propiolactone reacts with ammonium dithiocarbamate to give on acidification beta-dithiocarbamyl propionic acid. It is also known (Gresham et al. J. A. C. S. 70, 1001, 1948) that beta-dithiocarbamyl propionic acid readily cyclizes to give a compound melting at 119–120° C. (cf. Holmberg-Ber. 47,159, 1914) which compound can be considered either 2-thiono-4-keto-1,3-thiazane or 2-mercapto-4-keto-5,6-dihydrothiazine, these two structures representing a tautomeric equilibrium as follows:

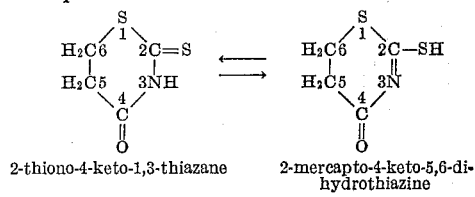

2-thiono-4-keto-1,3-thiazane    2-mercapto-4-keto-5,6-dihydrothiazine

This compound and its homologs wherein one or more of the hydrogen atoms attached to the carbon atoms in the 5 and 6 positions are replaced by alkyl groups will be hereinafter considered as 2-mercapto-4-keto-5,6-dihydrothiazines.

I have now discovered that such 2-mercapto-4-keto-5,6-dihydrothiazines react with amino compounds containing the HN< group such as ammonia, and certain amines and hydrazines to form new and useful beta-dithiocarbamyl carboxylic acid amides or hydrazides which may be isolated in good yield, or which if desired may be hydrolyzed in situ to give excellent yields of the corresponding beta-mercapto carboxylic acid amides or hydrazides. The general equations for these reactions are as follows:

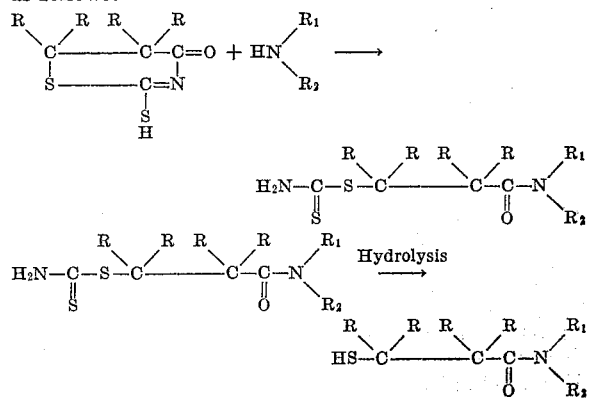

wherein each R represents hydrogen or alkyl and

represents the —NH₂ radical (derived by removing hydrogen from ammonia) or a radical derived by removing hydrogen from the HN< group of an amine or hydrazine containing such group. The formulae for

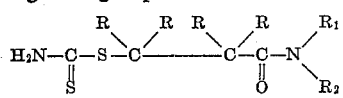

and

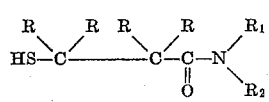

may alternately be represented by the general formula

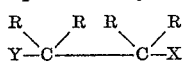

wherein R is selected from the class consisting of hydrogen and alkyl groups, Y is selected from the class consisting of HS— and

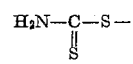

radicals or groups and X is selected from the class consisting of carboxylic acid amide, N substituted carboxylic acid amide and carmboxylic acid hydrazide groups.

These reactions afford a convenient and economical method of preparing a large number of chemical compounds. The beta-dithiocarbamyl compounds have not heretofore been prepared and are useful per se for many purposes. It is also advantageous to prepare beta-mercapto amides and hydrazides by this method since it is difficult to obtain such compounds by seemingly more direct methods. In fact many useful beta-mercapto compounds obtainable in good yield by this method have not heretofore been obtained.

As indicated by the above formulae the thiazine reactant may be the specific compound 2-mercapto-4-keto-5,6-dihydrothiazine or it may be a homolog thereof in which one or more of the hydrogens attached to the 5 and 6 carbon atoms of the thiazine ring are replaced by alkyl groups. Such homologous thiazines are obtained when homologs of beta-propiolactone are used in the synthesis of beta-dithiocarbamyl carboxylic acids and the acids then cyclized.

The preferred 2-mercapto-4-keto-5,6-dihydrothiazines for use in this invention are those which possess the structure

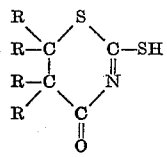

wherein each R is hydrogen or lower alkyl so that the 2-mercapto-4-keto-5,6-dihydrothiazine contains a total of from 4 to 8 carbon atoms.

The amino reactant may be ammonia or any amine or hydrazine containing the HN< group. Amines of this type may be aliphatic, alicyclic, aromatic or heterocyclic, primary or secondary, saturated or unsaturated, substituted or unsubstituted. Specific examples of such amines include methylamine, ethylamine, propylamine, butylamine, amylamine, hexylamine, decylamine, dodecylamine, octadecylamine, dimethylamine, diethylamine, dipropylamine, dibutylamine, diamylamine, diheptylamine, didecylamine, didodecylamine, allylamine, N-propyl-allylamine, N-decyl-allylamine, N-butyl-decylamine, 2 - chloro-propylamine, aniline, o-toluidine, m-toluidine, p-toluidine, 4-methoxyaniline, 3-methoxyaniline, 4-ethoxyaniline, N-allyl-aniline, N-benzylaniline, o - chloraniline, m - chloroaniline, p - chloroaniline, o - fluoroaniline, m-bromoaniline, p-iodoaniline, 2,4-dichloroaniline, diphenylamine, beta-naphthylamine, N-butyl-aniline, p-isopropyl-aniline, 4-nitro-o-toluidine, 2-bromo-p-toluidine, 6-nitro-1-naphthylamine, N-ethyl-2-naphthylamine, N - 1 - naphthyl-o-toluidine, 1,2-propanediamine, o-phenylenediamine, p-(alpha-phenylisopropyl) aniline, mesidine, cyclohexylamine, dicyclohexylamine, 1-fluorenamine, N-cyclohexyl-heptylamine, piperidine, morpholine, piperazine, etc. The preferred amines contain from 1 to 15 carbon atoms.

The compounds first obtained by the reaction of ammonia or amines with the preferred 2-mercapto-4-keto-5,6-dihydrothiazines possess the structure:

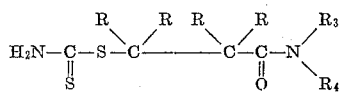

wherein each R is hydrogen or lower alkyl, and

represents —NH$_2$ or the radical derived by removing hydrogen from the HN< group of an amine, each of R$_3$ and R$_4$ preferably being hydrogen or a hydrocarbon radical or an unreactive substituted hydrocarbon radical such as halo-, nitro-and alkoxy-substituted hydrocarbon radicals. These compounds may then be hydrolyzed to form the corresponding beta-mercaptopropionamides which possess the structure:

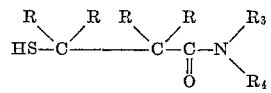

R, R$_3$ and R$_4$ having the significance given above.

In place of ammonia or an amine, hydrazines containing the HN< group may be reacted with 2-mercapto-4-keto-5,6-dihydrothiazines in accordance with the invention. Specific hydrazines which may be used include hydrazine, methylhydrazine, ethylhydrazine, propylhydrazine, butylhydrazine, hexylhydrazine, decylhydrazine, dimethylhydrazine, dipropylhydrazine, 1-ethyl-2-propylhydrazine, dihexylhydrazine, phenylhydrazine, 1-methyl-1 - phenylhydrazine, 1,2 - diphenylhydrazine, p - nitrophenylhydrazine, m-nitrophenylhydrazine, naphthylhydrazine, p-chlorophenylhydrazine, acetylhydrazine, 1-(5,8-dichloro - 2 - naphthoyl)-2-isopropylidenehydrazine, 1-ethyl-1-phenethylhydrazine etc. The compounds obtained by the reaction of hydrazines with 2-mercapto-4-keto-5,6-dihydrothiazines possess the structure:

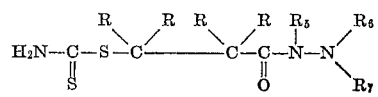

wherein

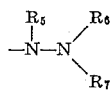

represents the radical derived by removing hydrogen from the HN< group of a hydrazine, R$_5$, R$_6$ and R$_7$ preferably being hydrogen or a hydrocarbon or unreactive substituted hydrocarbon radical. Such compounds hydrolyze to form beta-mercapto carboxylic acid hydrazides of the structure:

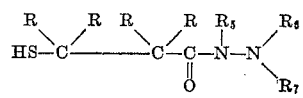

No special conditions or precautions are necessary in carrying out the reaction of ammonia, amines or hydrazines with 2-mercapto-4-keto-5,6-dihydrothiazines, the reaction proceeding readily in most cases simply by efficiently admixing the two reactants at room temperature preferably in the presence of an inert liquid solvent or diluent. However, it is frequently desirable to reflux the reactants at the boiling point of the liquid solvent or diluent in order that the reaction will proceed to completion at a satisfactory rate. The solvent or diluent may be water, alcohol, benzene, toluene, dioxane or the like, and is preferably one in which the product is insoluble so that the product precipitates from the reaction medium and is easily recovered in crystalline form. It is often desirable to employ a small amount of an organic acid such as acetic acid or an inorganic acid such as hydrochloric acid along with the inert solvent or diluent thereby facilitating dissolution of the reactants.

If the beta-mercapto compound is the product desired it is not necessary to isolate the beta-dithiocarbamyl compound, but instead the original reaction product may be treated in situ with aqueous alkali and acidified to give the beta-mercapto compound directly. However, if desired, the beta-dithiocarbamyl compound may be first isolated and then hydrolyzed to give the beta-mercapto compound.

As shown by the general reaction hereinabove, one mole of ammonia, amine or hydrazine is stoichiometrically required to react with one mole of 2-mercapto-4-keto-5,6-dihydrothiazine in accordance with the invention. However, this molar ratio is not at all critical, and, in fact, a stoichiometric excess of either reactant for example, about 0.1 to 10 moles of the ammonia, amine or hydrazine for each mole of the 2-mercapto-4-keto-5,6-dihydrothiazine may be used with good results.

The more detailed practice of the invention is illustrated by the following examples, wherein parts are given by weight. There are, of course, many other reaction procedures which are operative other than these specific examples and which will be apparent to those skilled in the art.

*Example I*

Ten parts (0.068 mole) of 2-mercapto-4-keto-5,6-dihydrothiazine are added to 27 parts concentrated ammonium hydroxide (28%, density 0.9, 0.2 mole ammonium hydroxide) in a glass reactor. The thiazine dissolves completely and in a few minutes light tan crystals deposit from the solution. The solution is cooled in an ice bath and 6.6 parts (59%) of beta-dithio-carbamyl propionamide are obtained. The product melts at 110° C.–111° C. after being recrystallized from a hexane-alcohol solution. The following analysis is obtained:

|  | Calculated for C$_4$H$_8$ON$_2$S$_2$ | Found |
|---|---|---|
| Percent C | 37.50 | 37.49 |
| Percent H | 6.25 | 6.22 |
| Percent N | 14.58 | 14.44 |
| Percent S | 33.33 | 33.28 |
| Neutral Equivalent | 192 | 192 |

A sample of beta-dithiocarbamyl propionamide thus prepared is hydrolyzed in the presence of aqueous sodium hydroxide to give beta-mercaptopropionamide.

*Example II*

15 parts (0.102 mole) of 2-mercapto-4-keto-5,6-dihydrothiazines, 20.8 parts (0.12 mole) of dodecylamine and 31 parts of benzene are refluxed for 1.5 hours. On cooling a gelatinous precipitate forms. This precipitate is washed twice with hexane and recrystallized from ethanol to give 13.5 parts (42%) of N-dodecyl beta-dithiocarbamyl propionamide (M. P. 16.5° C.–17.5° C.). Nitrogen analysis: Calculated for C$_{16}$H$_{32}$ON$_2$S$_2$—8.44%; Found—8.24%.

Example III 7.3 parts (0.05 mole of 2-mercapto-4-keto-5,6-dihydrothiazine are placed in a glass reactor. 12 parts of a 25% aqueous solution of dimethylamine are slowly added to the thiazine and as the yellow thiazine crystals dissolve white crystals deposit from the solution. The solution is then filtered and 6 parts (63%) of N,N-dimethyl-beta-dithiocarbamyl propionamide are obtained. After recrystallization from water the product melts at 124° C.–125° C. The following analysis is obtained:

|  | Calculated for $C_6H_{12}ON_2S$ | Found |
| --- | --- | --- |
| Percent C | 37.50 | 37.49 |
| Percent H | 6.25 | 6.22 |
| Percent N | 14.58 | 14.44 |
| Percent S | 33.33 | 33.28 |
| Neutral Equivalent | 192 | 192 |

N,N - dimethyl - beta - mercaptopropionamide is then prepared by hydrolyzing N,N-dimethyl-beta-dithiocarbamylpropionamide in the presence of 5% aqueous sodium hydroxide and precipitating the product with hydrochloric acid.

Example IV

A solution consisting of 29.4 parts (0.2 mole) of 2-mercapto-4-keto-5,6-dihydrothiazine, 46.4 parts (0.5 mole) of aniline, 2.36 parts concentrated hydrochloric acid and 88 parts of benzene is refluxed for 4 hours and on cooling a precipitate forms. The precipitate is washed with petroleum ether and recrystallized from a heptane-alcohol solution to yield 11 parts of beta-dithiocarbamyl propionanilide (M. P. 135° C.–136.5 C.) analysis:

|  | Calculated for $C_{10}H_{12}ON_2S_2$ | Found |
| --- | --- | --- |
| Percent C | 50.5 | 50.27 |
| Percent H | 5.00 | 5.07 |
| Percent N | 11.67 | 11.69 |
| Percent S | 26.6 | 26.7 |

A sample of beta-dithiocarbamyl propionanilide is dissolved in 5% sodium hydroxide. Hydrochloric acid is added and beta-mercaptopropionanilide (M. P. 87° C.–89° C.) is obtained.

Example V

Beta - dithiocarbamyl propion - p - toluide (M. P. 145.5° C.–146.5° C.) is prepared by using the same molar quantities (substituting p-toluidine for aniline) and the procedure of Example IV. The following analysis is obtained:

|  | Calculated for $C_{11}H_{14}ON_2S_2$ | Found |
| --- | --- | --- |
| Percent C | 52.0 | 52.09 |
| Percent H | 5.51 | 5.47 |
| Percent N | 11.1 | 10.92 |

A sample of beta-dithiocarbamyl propion-p-toluidide is dissolved in 5% NaOH and precipitated with hydrochloric acid to give beta-mercaptopropion-p-toluidide (M. P. 86° C. to 87° C.). Analysis:

|  | Calculated for $C_{10}H_{13}ONS$ | Found |
| --- | --- | --- |
| Percent C | 61.6 | 61.49 |
| Percent H | 6.66 | 6.69 |
| Percent N | 7.18 | 7.18 |

Example VI p-Anisidine (4-methoxyaniline) and 2-mercapto-4-keto-5,6-dihydrothiazine are reacted utilizing the procedure of Example IV. N-(4-methoxy-phenyl) beta-dithiocarbamyl propionamide (M. P. 149° C.) is obtained in excellent yield.

N - (4 - methoxyphenyl) - beta - mercaptopropionamide is then prepared by hydrolyzing a sample of the N-(4-methoxyphenyl)-beta-dithiocarbamyl propionamide with 5% sodium hydroxide. The product melts at 74°–75° C. and gives the following analysis:

|  | Calculated for $C_{10}H_{13}O_2NS$ | Found |
| --- | --- | --- |
| Percent C | 56.8 | 55.91 |
| Percent H | 6.16 | 6.16 |
| Percent N | 6.66 | 6.48 |
| Percent S | 15.15 | 14.87 |

Example VII 29.4 parts (0.2 mole) of 2-mercapto-4-keto-5,6-dihydrothiazine, 21.5 parts (0.2 mole) of o-toluidine, 88 parts benzene and 2.36 parts concentrated hydrochloric acid are refluxed for 12 hours. After cooling, the benzene is removed and the product is dissolved in chloroform and extracted three times with 10% sodium hydroxide. Upon acidification of the organic layer there are obtained 17 parts of beta-mercaptopropion-o-toluidide (M. P. 74–75° C.). Analysis:

|  | Calculated for $C_{11}H_{13}ONS$ | Found |
| --- | --- | --- |
| Percent C | 61.6 | 61.62 |
| Percent H | 6.66 | 6.76 |
| Percent N | 7.18 | 7.16 |

Example VIII p-(Alpha-phenylisopropyl) aniline and 2-mercapto-4-keto-5,6-dihydrothiazine are reacted as in Example VII. The reaction product is extracted with 10% sodium hydroxide and acidified to give N-[p-(alpha-phenylisopropyl) phenyl] beta-mercaptopropionamide (M. P. 125° C.–126° C.) in very good yield. The product gives the following analysis:

|  | Calculated for $C_{18}H_{21}ONS$ | Found |
| --- | --- | --- |
| Percent C | 72.3 | 72.2 |
| Percent H | 7.03 | 7.02 |
| Percent N | 4.70 | 4.86 |

Example IX 7.3 parts (0.05 mole) of 2-mercapto-4-keto-5,6-dihydrothiazine, and 7.3 parts (0.05 mole) of p-nitrophenylhydrazine are dissolved in ethanol. 2.7 parts of glacial acetic acid are added and the solution heated to the boiling point for 0.5 hour; on cooling, 2 parts of beta-(dithiocarbamyl) propanoic-4-nitrophenylhydrazide of the structure

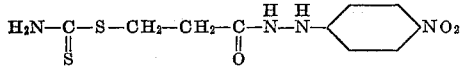

crystallize from the solution. After recrystallization from an ethanol:water solution the product melts with decomposition at 204° C. The compound gave the following analysis:

|  | Calculated for $C_{10}H_{12}O_3N_4S_2$ | Found |
| --- | --- | --- |
| Percent C | 40.00 | 40.06 |
| Percent H | 4.00 | 4.08 |
| Percent N | 18.67 | 18.72 |
| Percent S | 21.33 | 21.34 |
| Mol. Wt | 300 | 296 |

A sample of the product thus obtained is then converted to beta-(mercapto) propanoic-4-nitrophenylhydrazide by treating said product with a 5% solution of sodium hydroxide.

When other 2-mercapto-4-keto-5,6-dihydrothiazines in which one or more of the hydrogen atoms on the 5 and 6 position are replaced by lower alkyl radicals, are substituted for the parent compound 2-mercapto-4-keto-5,6- dihydrothiazine, other beta-dithiocarbamyl- and beta-mercaptopropionamides as the corresponding hydrazides are obtained.

The novel compounds of this invention are very valuable compounds, being especially useful as insecticides, fungicides, plant hormones, and as modifiers for polymerizations such as the emulsion copolymerization of butadiene with styrene and similar monomers. Moreover, they are also useful in the synthesis of various other organic chemicals.

Although specific examples have been included herein it is not intended to limit the invention solely thereto, but to include the numerous variations and modifications which will be apparent to those skilled in the art and which are included within the spirit and scope of this invention as defined in the appended claims.

I claim:

1. The method which comprises reacting a compound of the structure

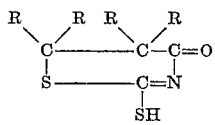

wherein each R is selected from the class consisting of hydrogen and alkyl, with a compound containing the HN< group and selected from the class consisting of ammonia, amines and hydrazines, thereby to form a compound of the structure

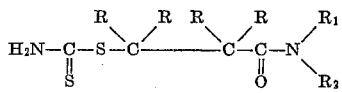

wherein R has the same significance as above and

represents the radical derived by removing hydrogen from the

group of said compound selected from the class consisting of ammonia, amines and hydrazines.

2. The method which comprises reacting 2-mercapto-4-keto-5,6-dihydrothiazine with a compound containing the HN< group and selected from the class consisting of ammonia, amines and hydrazines, thereby to form a compound of the structure

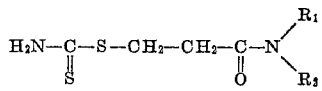

wherein

represents the radical derived by removing hydrogen from the

group of said compound selected from the class consisting of ammonia, amines and hydrazines.

3. The method which comprises reacting 2-mercapto-4-keto-5,6-dihydrothiazine and an amine having at least one hydrogen atom attached to the amino nitrogen atom, thereby to form a compound of the structure

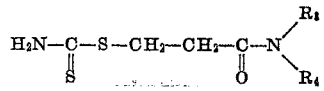

wherein

represents the radical derived by removing hydrogen from the

group of said amine.

4. The method of claim 3 wherein the amine is dimethyl amine, the product obtained being N,N-dimethyl-beta-dithiocarbamylpropionamide.

5. The method which comprises bringing together 2-mercapto-4-keto-5,6-dihydrothiazine and ammonia, thereby to form beta-dithiocarbamylpropionamide.

6. The method which comprises bringing together 2-mercapto-4-keto-5,6-dihydrothiazine and aniline, thereby to form beta-dithiocarbamylpropionanilide.

7. A method of preparing compounds having the general structure

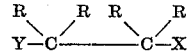

wherein Y represents a member selected from the class of HS— and

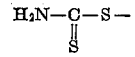

groups, X represents a member selected from the class of carboxylic acid amide, N mono- and di-substituted carboxylic acid amides, each of the substituents having from 1 to 15 carbon atoms and carboxylic acid hydrazide groups, and R represents a member selected from the class consisting of hydrogen and alkyl groups, said method comprising reacting a compound having the structure

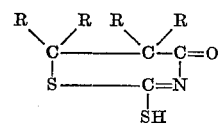

in which R has the same significance as above, with a compound having an HN< group and selected from the class consisting of ammonia, primary and secondary amines and hydrazines to form a compound having the structure

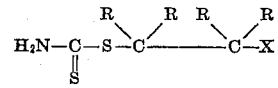

in which R and X have the same significance as above, and hydrolyzing the dithiocarbamyl group of the compound having the structure

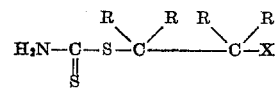

to form a compound having the structure

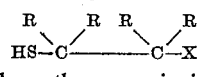

wherein R and X have the same significance as above.

8. The method of Claim 7 wherein the compound of the structure

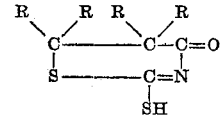

is 2-mercapto-4-keto-5,6-dihydrothiazine, the compound obtained possessing the structure

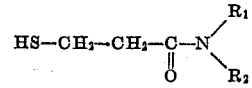

wherein

represents the radical derived by removing hydrogen from the HN< group of a compound selected from the class consisting of ammonia, amines and hydrazines.

9. The method which comprises reacting 2-mercapto-4-keto-5,6-dihydrothiazine and an amine having at least one hydrogen atom attached to the amino nitrogen atom, thereby to form a compound of the structure

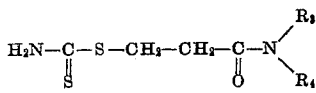

wherein

represents the radical derived by removing hydrogen from the

of said amine, and hydrolyzing said compound to form a compound of the structure

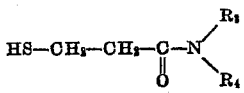

wherein

has the same significance as above.

10. The method of claim 9 wherein the amine is o-toluidine, the compound obtained being beta-mercapto-propion-o-toluidide.

11. The method of claim 9 wherein the amine is aniline, the compound obtained being beta-mercaptopropionanilide.

12. A new chemical compound of the structure

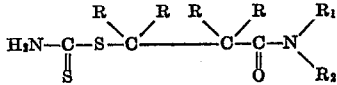

wherein R is selected from the class consisting of hydrogen and alkyl and

represents the radical derived by removing hydrogen from the

group of a compound selected from the class consisting of ammonia, amines and hydrazines.

13. A new chemical compound of the structure

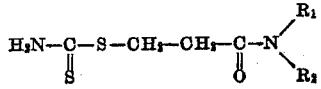

wherein

represents the radical derived by removing hydrogen from the

group of a compound selected from the class consisting of ammonia, amines and hydrazines.

14. A new chemical compound of the structure

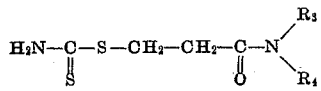

wherein

represents the radical derived by removing hydrogen from the

group of an amine.

15. As a new chemical compound, beta-dithiocarbamylpropionamide.

16. As a new chemical compound, N,N-dimethyl-beta-dithiocarbamylpropionamide.

17. As a new chemical compound, beta-dithiocarbamylpropionanilide.

18. New chemical compounds having the structure

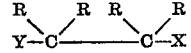

wherein R is selected from the class consisting of hydrogen and alkyl groups, Y is selected from the class consisting of HS— and

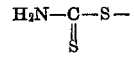

radicals and X is a hydrazide group having from 1 to 15 carbon atoms in the hydrazine nucleus.

19. New chemical compounds having the structure

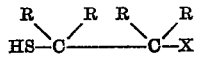

wherein R is selected from the class consisting of hydrogen and alkyl groups and X is a hydrazide group having from 1 to 15 carbon atoms in the hydrazine nucleus.

References Cited in the file of this patent

UNITED STATES PATENTS

| Number | Name | Date |
| --- | --- | --- |
| 2,312,694 | D'Alelio | Mar. 2, 1943 |
| 2,339,002 | Cooper | Jan. 11, 1944 |
| 2,412,700 | Weissberger et al. | Dec. 17, 1946 |
| 2,418,947 | Lott et al. | Apr. 15, 1947 |
| 2,518,154 | Lewenstein | Aug. 8, 1950 |
| 2,535,875 | Stewart | Dec. 26, 1950 |
| 2,607,789 | Weiss | Aug. 19, 1952 |
| 2,614,095 | Shelley | Oct. 14, 1952 |

OTHER REFERENCES

Beilstein vol. XII, 2nd supplement (1950) p. 253, also vol. 27, 1st supplement (1938), p. 312.